UNITED STATES PATENT OFFICE.

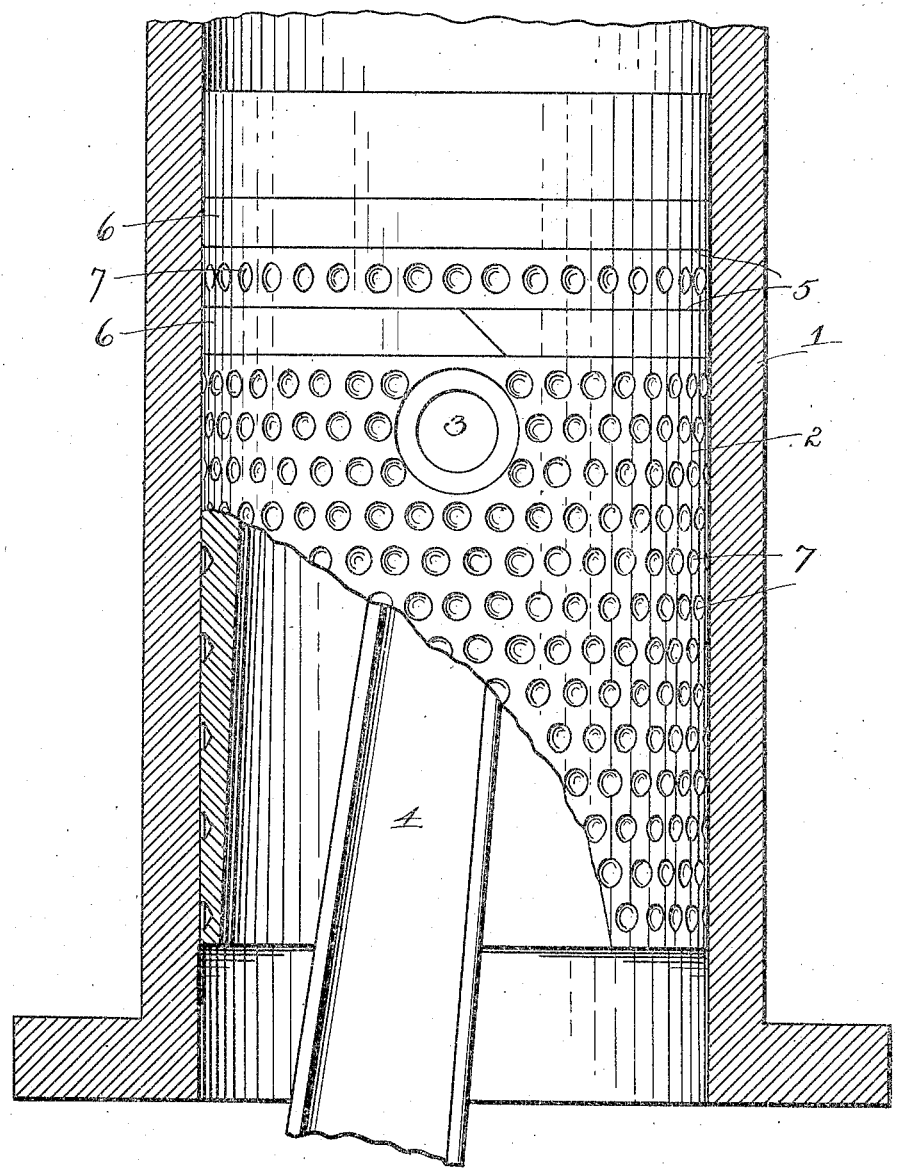

PETER GRABLER, OF CLEVELAND, OHIO.

PLUNGER AND CYLINDER PACKING.

1,016,561.　　　　Specification of Letters Patent.　　Patented Feb. 6, 1912.

Application filed June 2, 1909. Serial No. 499,741.

*To all whom it may concern:*

Be it known that I, PETER GRABLER, citizen of the United States, residing at Cleveland, in the county of Cuyahoga and State of Ohio, have invented certain new and useful Improvements in Plunger and Cylinder Packing, of which the following is a specification.

Heretofore it has been customary in pumps, engines and like structures employing cylinders and pistons or plungers to provide the latter with various kinds of packing rings and grooves and other means for preventing leakage and to make a tight fit, as it were, between the bearing surface of the plunger and the inner wall of the cylinder. Packing rings, which are well known and their operation well understood, are reasonably effective in producing this tight fit or joint and in many pump structures, especially pumps for liquids of various kinds, packing grooves have been used very effectively, but it is a fact that a plunger provided with more effective packing would be invaluable.

The object of the present invention, therefore, is to provide a plunger or cylinder, preferably the former, with means used in conjunction either with the packing rings already employed or independently for preventing the leakage around the plunger; for reducing the friction between the plunger and the cylinder wall; for preventing waste of the lubricant or fluid, and further to cause a sort of cushioning effect on all sides of the piston, thus causing it to float or move more freely within the cylinder.

Still more specifically the invention relates to a cylinder and plunger wherein the bearing surface of one of the members, preferably the plunger, is provided with a plurality of circumferentially isolated pockets which are adapted to receive and permit the expansion of a portion of the fluid, and thus hinder or prevent any further leakage between the parts and which will catch or hold the lubricant or fluid and prevent its wasting through between the parts.

The invention may be further briefly summarized as consisting in the construction and combinations of elements hereinafter set forth in the following description, drawings and claim.

Referring to the drawings, the figure represents a cylinder and plunger of a well known type wherein the latter is provided with my invention.

Any suitable form and construction of plunger and cylinder or piston and cylinder may be provided with my improved features, but I have shown a well known type in the drawings, which is very effective in operation, and in such embodiment the cylinder 1 is provided with a piston 2 having therein a wrist pin 3. Connected to this wrist pin is the usual connecting rod 4, a portion of which is shown in the drawings. The piston 2 may be further provided with suitable grooves 5 for receiving packing rings 6 of any preferred construction.

The description so far has been confined to features of ordinary construction which are well known in the art, but my invention comprehends the supplying of the plunger with a plurality of circumferentially isolated pockets 7 arranged close together over the entire bearing surface of the plunger whereby upon the leakage of the motive fluid around the plunger at one point, and upon the expansion of such fluid into these pockets, further leakage is substantially prevented by reason of the fact that before further leakage may take place, the expanded fluid, which has occupied some of the pockets, must be compressed again and before this may take place the plunger has reached the end of its stroke. In any event the expansion and passage around the plunger into several of these pockets will eliminate practically all the leakage of the motive fluid in practically any type of pump or engine. Furthermore there is an additional advantage in the pockets in that they will catch and hold the lubricant and prevent its wasting through.

Having described my invention, I claim:—

In combination, a cylinder, and a plunger having its bearing surface provided with a plurality of transversely isolated pockets.

In testimony whereof I affix my signature in presence of two witnesses.

PETER GRABLER.

Witnesses:
G. O. FARQUHARSON,
B. W. BROCKETT.